No. 631,602. Patented Aug. 22, 1899.
H. R. WOOD & G. R. TAITT.
HAMMOCK SUPPORT.
(Application filed Mar. 22, 1899.)

(No Model.)

WITNESSES:
Donn Twitchell
C R Ferguson

INVENTORS.
Homer R. Wood
George R. Taitt
BY
ATTORNEYS.

THE NORRIS PETERS CO., PHOTO-LITHO., WASHINGTON, D. C.

United States Patent Office.

HOMER R. WOOD AND GEORGE R. TAITT, OF PRESCOTT, ARIZONA TERRITORY.

HAMMOCK-SUPPORT.

SPECIFICATION forming part of Letters Patent No. 631,602, dated August 22, 1899.

Application filed March 22, 1899. Serial No. 710,118. (No model.)

*To all whom it may concern:*

Be it known that we, HOMER R. WOOD and GEORGE R. TAITT, of Prescott, in the county of Yavapai and Territory of Arizona, have invented a new and Improved Hammock-Support, of which the following is a full, clear, and exact description.

This invention relates to improvements in supports for hammocks; and the object is to provide a support that shall be strong, yet light and portable, making it particularly useful for camp or lawn purposes.

We will describe a hammock-support embodying our invention and then point out the novel features in the appended claims.

Reference is to be had to the accompanying drawings, forming a part of this specification, in which similar characters of reference indicate corresponding parts in all the figures.

Figure 2:
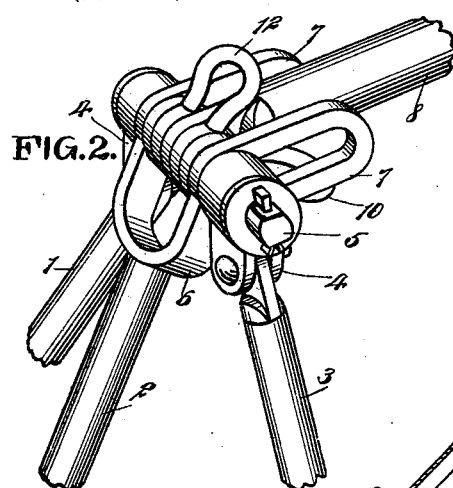
Figure 1:
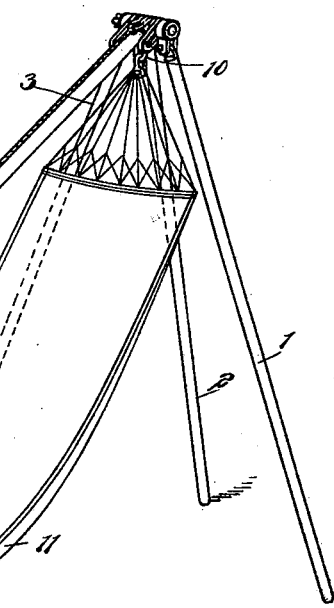
Figure 3:
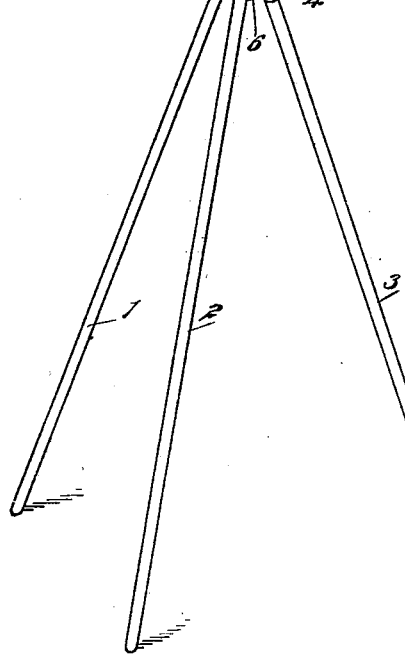
Figure 3:
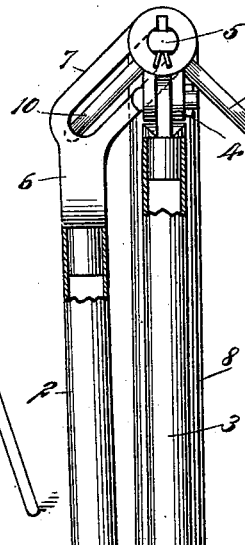
Figure 4:
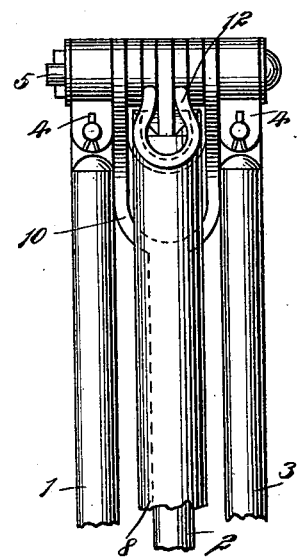

Figure 1 is a perspective view of a hammock-support embodying our invention. Fig. 2 is a perspective view of a portion of the support. Fig. 3 is a side view showing the support as folded, and Fig. 4 is a front view thereof folded.

The support comprises a tripod for each end of the hammock. Each tripod consists of the legs 1 2 3, which for the sake of lightness we make of tubular metal. The upper ends of the legs 1 and 3 have pivotal connection with clips 4, which are mounted on a cross-pin 5. The leg 2 is provided at its upper end with a U-shaped yoke 6, having upwardly and forwardly inclined arms 7, which are longitudinally slotted, and through these slots the cross-pin 5 extends. The object in providing the slotted arms extended at an angle to the yoke portion 6 is to permit of the leg 2 being folded down parallel with the legs 1 and 3 when said legs 1 and 3 are folded, as plainly indicated in Figs. 3 and 4.

Mounted to swing on the cross-piece 5 between the arms 7 is a spreader-section 8. These spreader-sections are of tubular metal, and one of the sections has attached to it a projection 9 of reduced diameter, adapted to engage in the end of the other section 8, so that when the sections are connected together, as shown in Fig. 1, they practically form one continuous rod or spreader.

Mounted to swing on the cross-pins 5 are clevises 10, adapted to receive the hooks at the end of the supporting-cords for the hammock 11, and also having swinging connection with the pins 5 above the spreader-sections are clevises 12, to which a canopy may be secured. We have here shown a rope or cord 13 as attached to these clevises 12, which will effectually prevent the two supports or tripods spreading one relatively to the other.

When the devices are not in use for supporting a hammock, the legs and the spreader-sections may be folded closely together, as indicated in Fig. 3. When desired for use, the several legs are to be spread apart and connection made between the spreader-sections 8, as clearly shown in Fig. 1.

A hammock-support embodying our improvement will be found of great utility in mining and camping districts, especially in tropical climates, where snakes, scorpions, centipedes, tarantulas, &c., abound.

Having thus fully described our invention, we claim as new and desire to secure by Letters Patent—

1. A hammock-support, comprising two tripods, each tripod consisting of outer legs, a pin on which said legs are mounted to swing, a center leg and arms extending at an angle to the length of the center leg and having slots through which the pin passes, substantially as specified.

2. A hammock-support, comprising two tripods, each tripod consisting of outer legs, clips pivotally connected to said legs, a cross-pin on which the clips are mounted, a center leg, a yoke on the center leg, arms extended at an angle from the yoke and having slots through which the pin passes, and a spreader-section having pivotal connection with the cross-pin, substantially as specified.

3. In a hammock-support, a cross-pin, clips mounted on the pin, legs pivoted to the clips, a center leg having swinging and sliding connection with the pin, a spreader-section mounted to swing on the pin, and a clevis on the pin below the spreader-section, substantially as specified.

4. In a hammock-support, a tripod comprising outer legs, clips to which the legs are pivoted, a pin on which the clips are mounted, a center leg having swinging and sliding connection with the pin, a spreader-section mounted on the pin, a clevis mounted on the pin and extended below the spreader-section, and a clevis on the pin and extended above the spreader-section, substantially as specified.

5. A hammock-supporting tripod, comprising outer legs, a pin on which said legs are mounted to swing and a center leg having swinging and sliding connection with the pin, substantially as specified.

6. A hammock-support, comprising tripods, each tripod consisting of outer legs, a cross-pin on which said legs are mounted to swing, a center leg, a yoke on the upper end of the center leg, slotted arms extended upward and forward from said yoke and through which the pin passes and tubular spreader-sections pivoted on the cross-pin of each tripod, one spreader-section having a reduced portion to engage in the other spreader-section, substantially as specified.

HOMER R. WOOD.
GEORGE R. TAITT.

Witnesses:
EUGENE BRADY O'NEILL,
JACOB A. C. FREUND.